(12) United States Patent
Marsch et al.

(10) Patent No.: US 11,046,011 B2
(45) Date of Patent: *Jun. 29, 2021

(54) DETERMINING A PRINTING ANOMALY RELATED TO A 3D PRINTED OBJECT

(71) Applicant: Capital One Services, LLC, McLean, VA (US)

(72) Inventors: Daniel Marsch, Arlington, VA (US); Kevin Osborn, Newton Highlands, MA (US); David Kelly Wurmfeld, Fairfax, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/521,070

(22) Filed: Jul. 24, 2019

(65) Prior Publication Data

US 2020/0114584 A1 Apr. 16, 2020

Related U.S. Application Data

(63) Continuation of application No. 16/159,219, filed on Oct. 12, 2018, now Pat. No. 10,363,705.

(51) Int. Cl.

| G05B 19/42 | (2006.01) |
| B29C 64/393 | (2017.01) |
| B29C 64/118 | (2017.01) |
| B29C 64/209 | (2017.01) |
| B33Y 30/00 | (2015.01) |
| B33Y 50/02 | (2015.01) |
| B33Y 10/00 | (2015.01) |

(52) U.S. Cl.
CPC .......... *B29C 64/393* (2017.08); *B29C 64/118* (2017.08); *B29C 64/209* (2017.08); *B33Y 10/00* (2014.12); *B33Y 30/00* (2014.12); *B33Y 50/02* (2014.12)

(58) Field of Classification Search
CPC .................................................. G05B 19/4202
USPC ........................................................ 700/98
See application file for complete search history.

(56) References Cited

U.S. PATENT DOCUMENTS

| 9,507,555 B2 | 11/2016 | Liu et al. |
| 10,363,705 B1 | 7/2019 | Marsch et al. |
| 2014/0277669 A1 | 9/2014 | Nardi et al. |
| 2015/0301517 A1* | 10/2015 | Chen ..................... B33Y 50/02 700/118 |

(Continued)

*Primary Examiner* — Suresh Suryawanshi
(74) *Attorney, Agent, or Firm* — Harrity & Harrity, LLP

(57) ABSTRACT

A device may obtain measurement data concerning a three-dimensional (3D) printed object, where the 3D printed object has a plurality of physical elements that comprise a plurality of different physical attributes, and where the plurality of physical elements and the plurality of different physical attributes are designed to exhibit one or more printing capabilities of a 3D printer that printed the 3D printed object. The device may process the measurement data to determine one or more printing anomalies relating to one or more physical elements, of the plurality of physical elements, and one or more physical attributes of the plurality of different physical attributes. The device may generate a set of instructions to permit the 3D printer to be adjusted to address the one or more printing anomalies, and may cause an action to be performed based on generating the set of instructions.

20 Claims, 12 Drawing Sheets

(56) References Cited

U.S. PATENT DOCUMENTS

| | | | |
|---|---|---|---|
| 2015/0312119 A1* | 10/2015 | Liu | B29C 64/393 709/204 |
| 2015/0321422 A1 | 11/2015 | Boyer et al. | |
| 2015/0328839 A1 | 11/2015 | Willis et al. | |
| 2016/0046076 A1 | 2/2016 | Huang et al. | |
| 2016/0185049 A1* | 6/2016 | Tanaka | G05B 19/4099 700/98 |
| 2016/0236414 A1 | 8/2016 | Reese et al. | |
| 2016/0236416 A1 | 8/2016 | Bheda et al. | |
| 2017/0050382 A1 | 2/2017 | Minardi et al. | |
| 2017/0057170 A1 | 3/2017 | Gupta et al. | |
| 2017/0312987 A1 | 11/2017 | Ladanyi et al. | |
| 2018/0095450 A1 | 4/2018 | Lappas et al. | |
| 2019/0001574 A1* | 1/2019 | Yackabonis | G06F 3/1206 |

* cited by examiner

DETERMINING A PRINTING ANOMALY RELATED TO A 3D PRINTED OBJECT

RELATED APPLICATION

This application is a continuation of U.S. patent application Ser. No. 16/159,219, filed Oct. 12, 2018 (now U.S. Pat. No. 10,363,705), which is incorporated herein by reference.

BACKGROUND

A three-dimensional (3D) printer may create a 3D printed object. The 3D printer may use a 3D printing technique, such as an additive manufacturing technique, a subtractive manufacturing technique, and/or the like to create the 3D printed object.

SUMMARY

According to some possible implementations, a non-transitory computer-readable medium may store instructions that include one or more instructions that, when executed by one or more processors of a device, cause the one or more processors to obtain measurement data concerning a three-dimensional (3D) printed object, wherein the 3D printed object has a plurality of physical elements that comprise a plurality of different physical attributes, and wherein the plurality of physical elements and the plurality of different physical attributes are designed to exhibit one or more printing capabilities of a 3D printer that printed the 3D printed object. The one or more instructions may cause the one or more processors to process the measurement data to determine one or more printing anomalies relating to one or more physical elements, of the plurality of physical elements, and one or more physical attributes of the plurality of different physical attributes. The one or more instructions may cause the one or more processors to generate a set of instructions to permit the 3D printer to be adjusted to address the one or more printing anomalies, and to cause an action to be performed based on generating the set of instructions.

According to some possible implementations, a device may include one or more memories, and one or more processors, communicatively coupled to the one or more memories, to obtain measurement data concerning a three-dimensional (3D) printed object, wherein the 3D printed object has a plurality of physical elements that comprise a plurality of different physical attributes, and wherein the plurality of physical elements and the plurality of different physical attributes are designed to exhibit one or more capabilities of a 3D printer that printed the 3D printed object. The one or more processors may determine one or more printing errors relating to one or more physical elements, of the plurality of physical elements, or one or more physical attributes of the plurality of different physical attributes based on the measurement data. The one or more processors may generate a set of instructions to permit the 3D printer to be adjusted to prevent future printing errors, and may cause an action to be performed based on generating the set of instructions.

According to some possible implementations, a method may include obtaining, by a device, measurement data concerning a three-dimensional (3D) printed object that was printed by a 3D printer, wherein the 3D printed object has a plurality of physical elements, and wherein the plurality of physical elements comprises at least two of one or more cylinders, one or more pyramids, one or more spheres, one or more frustums, one or more cubes, one or more prisms, or one or more cones. The method may include processing, by the device, the measurement data to determine one or more calibration issues relating to one or more physical elements of the plurality of physical elements. The method may include generating, by the device, a set of instructions to permit the 3D printer to be adjusted to address the one or more calibration issues, and causing, by the device, an action to be performed based on generating the set of instructions.

DETAILED DESCRIPTION

Figure 1A:
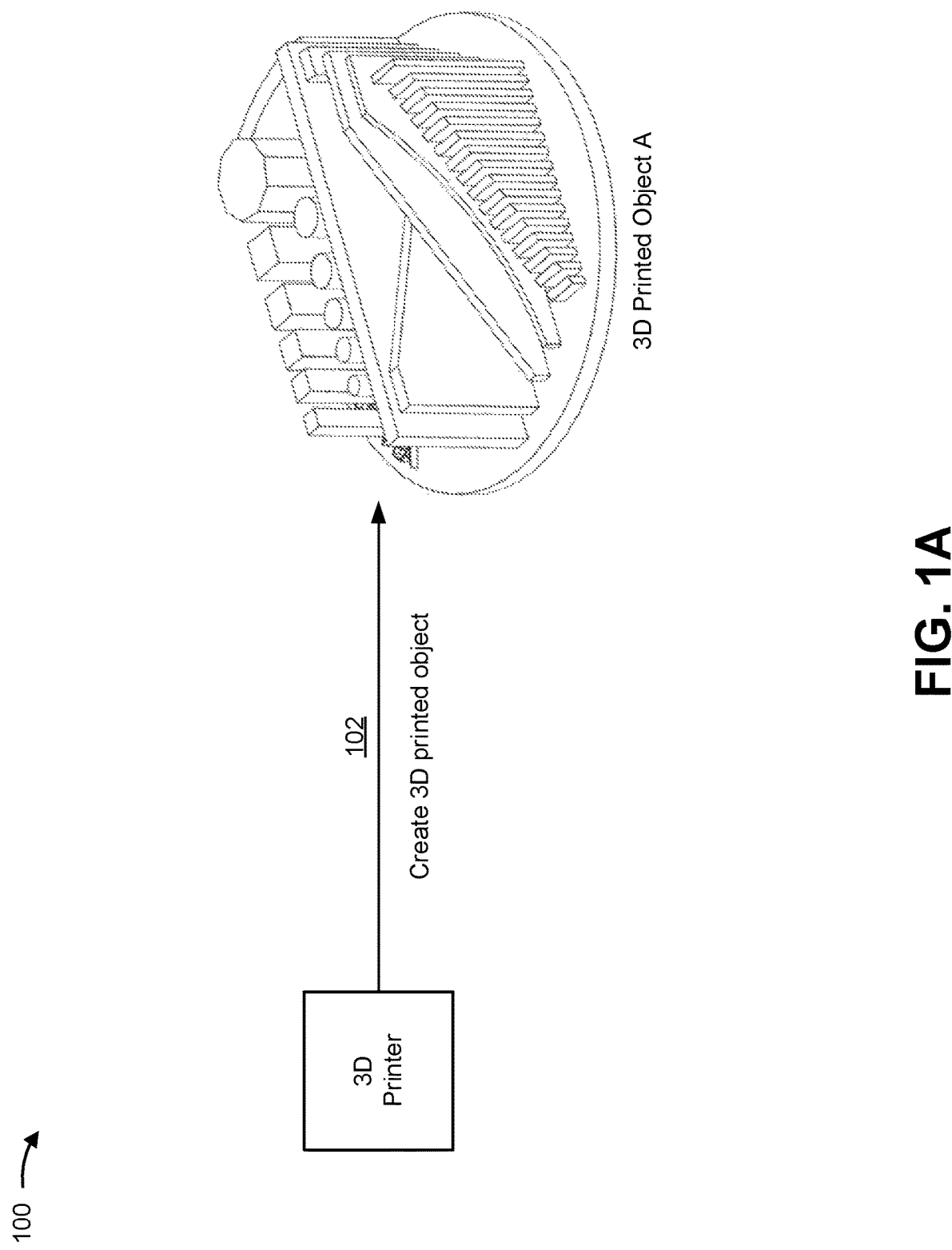
FIGS. 1A-1G are diagrams of example implementations described herein.

The following detailed description of example implementations refers to the accompanying drawings. The same reference numbers in different drawings may identify the same or similar elements.

Many steps are needed for a three-dimensional (3D) printer to print a 3D printed object. First, a modelling application, such as a computer-aided design (CAD) application, creates a model of the 3D printed object. Typically, the CAD application creates a model file, such as a Standard for the Exchange of Product model data (STEP) file, an initial graphics exchange specification (IGES) file, and/or the like to represent the model. Second, a meshing application converts the model file into a surface representation file, such as a standard triangle language (STL) file, that represents a surface representation of the model. Third, a slicing application reads the surface representation file and slices the surface representation of the model into paths that one or more physical components of the 3D printer can follow to print the 3D printed model. The slicing application creates a machine readable file, such as a geometric code (G-code) file, that can be read by one or more digital processing components of the 3D printer. Fourth, a machine controller, which may be part of the one or more digital processing components, translates the machine readable file into commands for operating the one or more physical components of the 3D printer to print the 3D printed object. Fifth, the 3D printer uses the one or more physical components, based on the commands, to print the 3D printed object. Accordingly, there are many chances for one or more printing errors to be created and/or propagated in the 3D printing process. However, no current method and/or tool exists to facilitate determining an origin of the one or more printing errors.

Some implementations described herein provide a user device that is capable of obtaining and processing measurement data concerning a 3D printed object to determine one or more printing anomalies, one or more printing errors, and/or one or more calibration issues concerning the 3D printed object. In some implementations, the 3D printed object has a plurality of physical elements that comprise a plurality of different physical attributes, wherein the plurality of physical elements and the plurality of different physical attributes are designed to exhibit one or more printing capabilities of a 3D printer that printed the 3D printed object. In some implementations, the user device generates a set of instructions to permit the 3D printer to be adjusted to address the one or more printing anomalies, the one or more printing errors, and/or the one or more calibration issues concerning the 3D printed object. In some implementations, the user device causes an action to be performed based on generating the set of instructions, such as causing display of the set of instructions on the user device, sending the set of instructions to the 3D printer to cause the 3D printer to display the set of instructions and/or execute the set of instructions, and/or the like.

In this way, the user device helps identify one or more physical components, one or more digital processing components, and/or the like of the 3D printer that need to be adjusted to minimize or prevent future printing anomalies, printing errors, and/or calibration issues from occurring. This may prevent inaccurate 3D printed objects from being created, which may conserve 3D printer resources (e.g., filament made of plastic, metal, plaster, and/or the like), associated with printing the 3D printed object, power, and/or the like that would otherwise need to be expended to reprint the 3D printed objects. This also may prevent time, the 3D printer resources, power, and/or the like from being wasted reprinting the 3D printed objects.

Moreover, the 3D printer may not need to undergo an expensive and/or a time-consuming diagnostic process to determine the accuracy of the 3D printer. Further, the 3D printer may not need particular physical components and/or particular digital processing components to test the capabilities of the 3D printer. As such, the mechanical and/or electrical complexity of the 3D printer may be reduced. This may increase the life of the 3D printer and/or reduce the amount of maintenance that the 3D printer requires. Moreover, downtime of the 3D printer may be more predictable as efficient maintenance schedules can be generated and/or configured to enable service of the 3D printer. Accordingly, costs associated with maintaining the 3D printer can be decreased and/or minimized.

FIGS. 1A-1G are diagrams of example implementations 100 described herein. In some implementations, example implementation 100 may include a three-dimensional (3D) printer and/or a user device. In some implementations, the 3D printer and the user device may be connected via a network, such as the Internet, an intranet, and/or the like. In some implementations, the 3D printer may include one or more physical components, such as a motor, a gear, a filament, a spool, a band, a print head, an extruder, a fan, a heating element, a nozzle, and/or the like.

As shown in FIG. 1A and by reference number 102, the 3D printer may create a 3D printed object using a 3D printing technique, such as an additive manufacturing technique, a subtractive manufacturing technique, and/or the like. In some implementations, the 3D printer may operate and/or control the one or more physical components to create, print, generate, and/or the like the 3D printed object. In some implementations, the 3D printer may include one or more digital processing components to read a file, such as a geometric code (G-code) file, to generate and/or determine one or more commands to operate and/or control the one or more physical components.

Figure 1B:
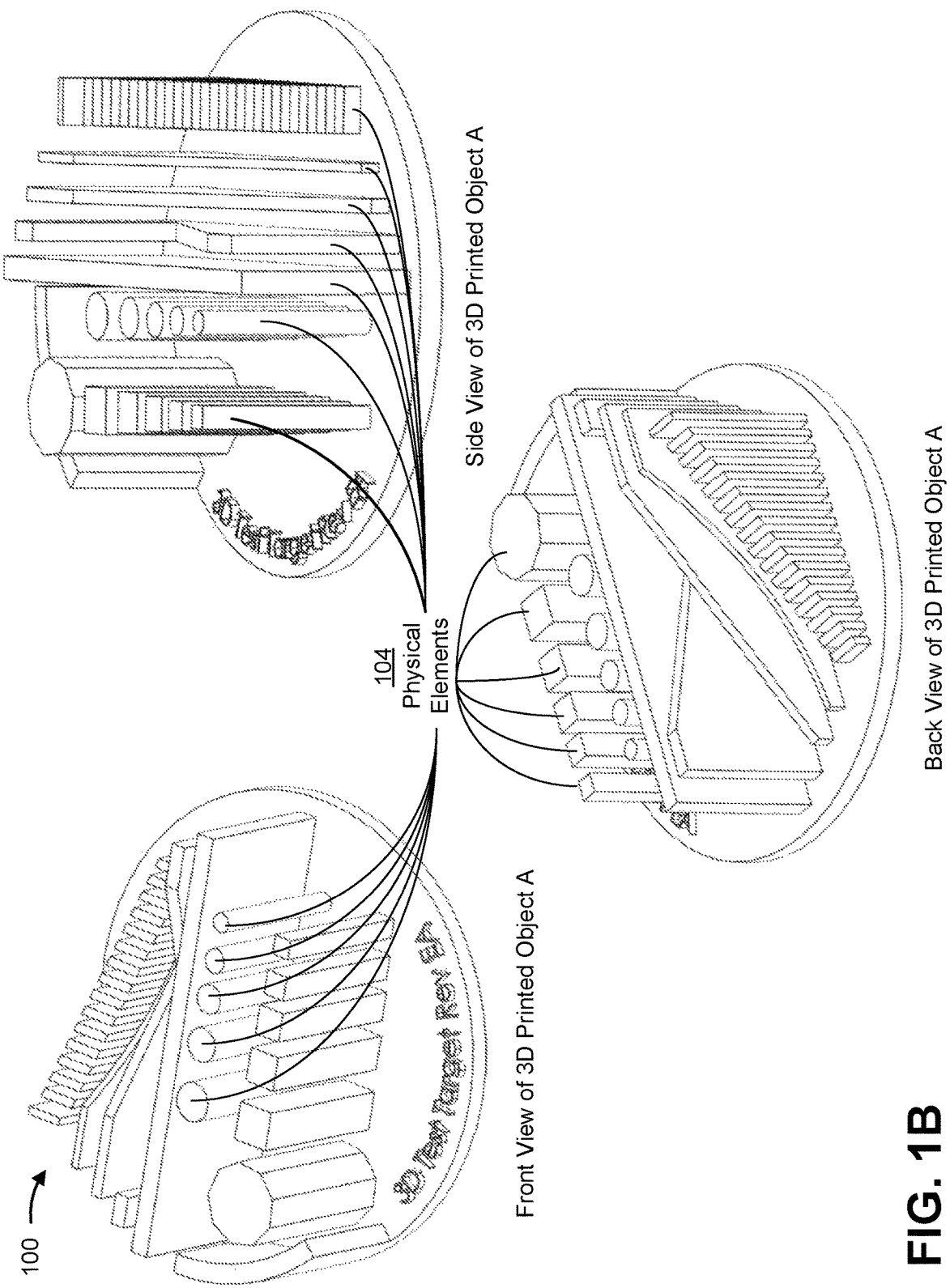

In some implementations, the 3D printed object may include a plurality of physical elements. As an example, as shown in FIG. 1B and by reference number 104, the 3D printer may create a first 3D printed object (shown as 3D printed object A) that includes a plurality of physical elements. In some implementations, the plurality of physical elements may include one or more shapes, such as one or more cylinders, one or more pyramids, one or more spheres, one or more frustums, one or more cubes, one or more cuboids, one or more prisms, one or more cones, one or more columns, and/or the like. For example, as shown in FIG. 1B, the first 3D printed object includes a plurality of cylinders, a plurality of cuboids, an octagonal column, and/or the like. In some implementations, the plurality of physical elements comprises one or more additive elements (e.g., one or more elements created using an additive manufacturing technique) or one or more subtractive elements (e.g., one or more elements created using a subtractive manufacturing technique).

Figure 1C:
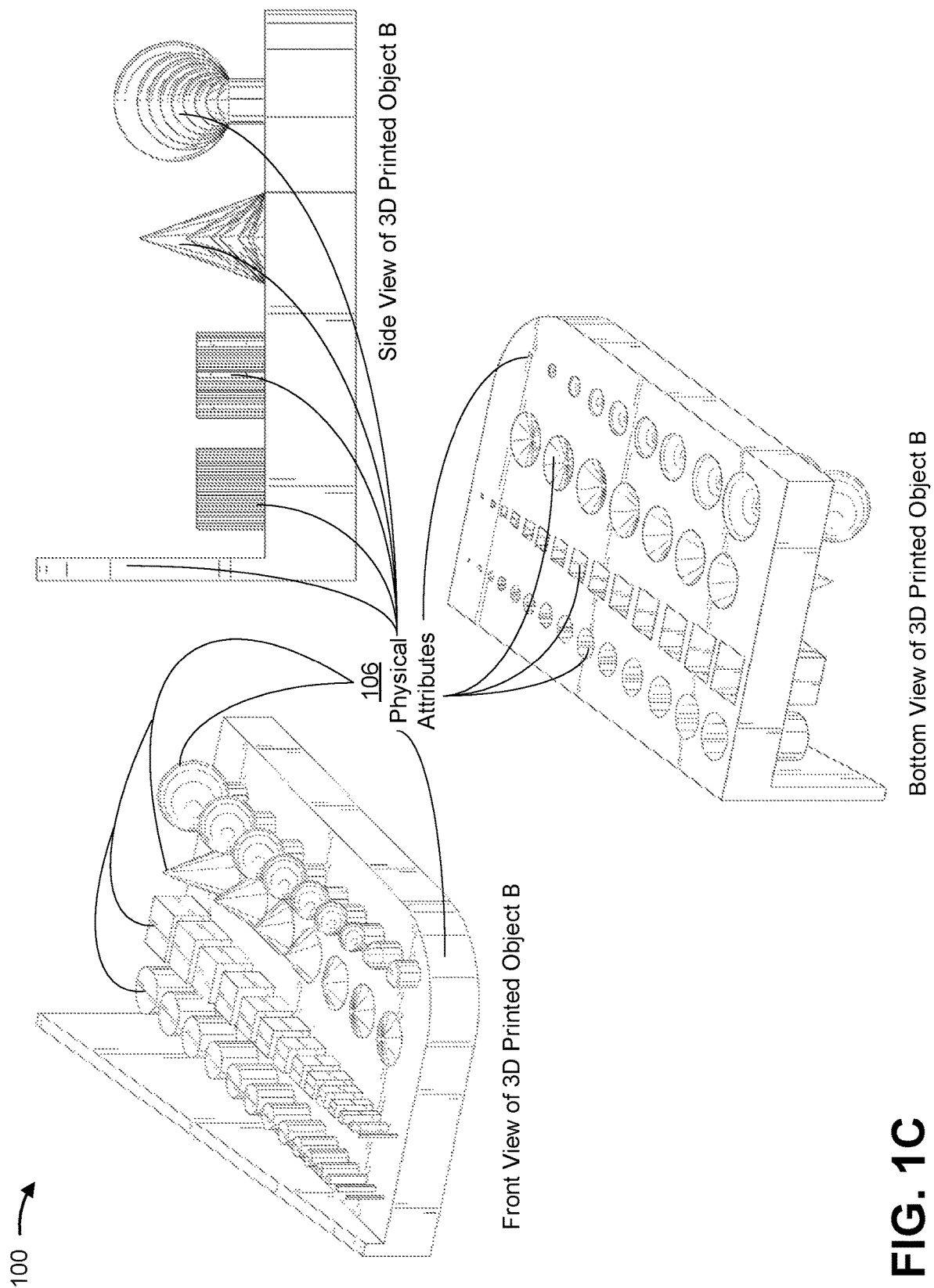

In some implementations, the 3D printed object may include a plurality of physical elements that comprise a plurality of different physical attributes. As an example, as shown in FIG. 1C and by reference number 106, the 3D printer may create a second 3D printed object (shown as 3D printed object B) that includes a plurality of physical elements that comprise a plurality of different physical attributes. In some implementations, the plurality of different physical attributes may include one or more features, such as one or more curved features, one or more concave features, one or more convex features, one or more plane features, one or more elliptical features, one or more hyperbolic features, one or more step features, one or more gradient features, and/or the like. For example, as shown in FIG. 1C, the second 3D printed object includes a plurality of physical elements (e.g., a plurality of cylinders, a plurality of cuboids, a plurality of cones, a plurality of cylinder-spheres (e.g., spheres on top of cylinders), and/or the like) that comprise a plurality of different physical attributes, such as one or more curved features, one or more concave features, one or more convex features, one or more plane features, one or more gradient features, and/or the like. In some implementations, the plurality of different physical attributes comprises one or more positive attributes (e.g., one or more attributes in positive space) and/or one or more negative attributes (e.g., one or more attributes in negative space).

In some implementations, the plurality of physical elements and/or the plurality of different physical attributes may be designed to exhibit one or more capabilities, such as printing capabilities, of the 3D printer that printed the 3D printed object. For example, the plurality of physical elements and the plurality of different physical attributes may be designed to exhibit an x-axis, a y-axis, and a z-axis printing capability of the 3D printer. In some implementations, the plurality of physical elements and/or the plurality of different physical attributes may be designed to exhibit one or more capabilities of one or more physical components of the 3D printer. For example, the plurality of physical elements and the plurality of different physical attributes may be designed to exhibit a capability of the motor of the 3D printer, a capability of the nozzle of the 3D printer, a capability of the extruder of the 3D printer, and/or the like. In some implementations, the plurality of physical elements and/or the plurality of different physical attributes may be designed to exhibit one or more capabilities of one or more digital processing components of the 3D printer. For example, the plurality of physical elements and the plurality of different physical attributes may be designed to exhibit an ability of the one or more digital processing components to generate commands for operating the one or more physical components.

Figure 1D:
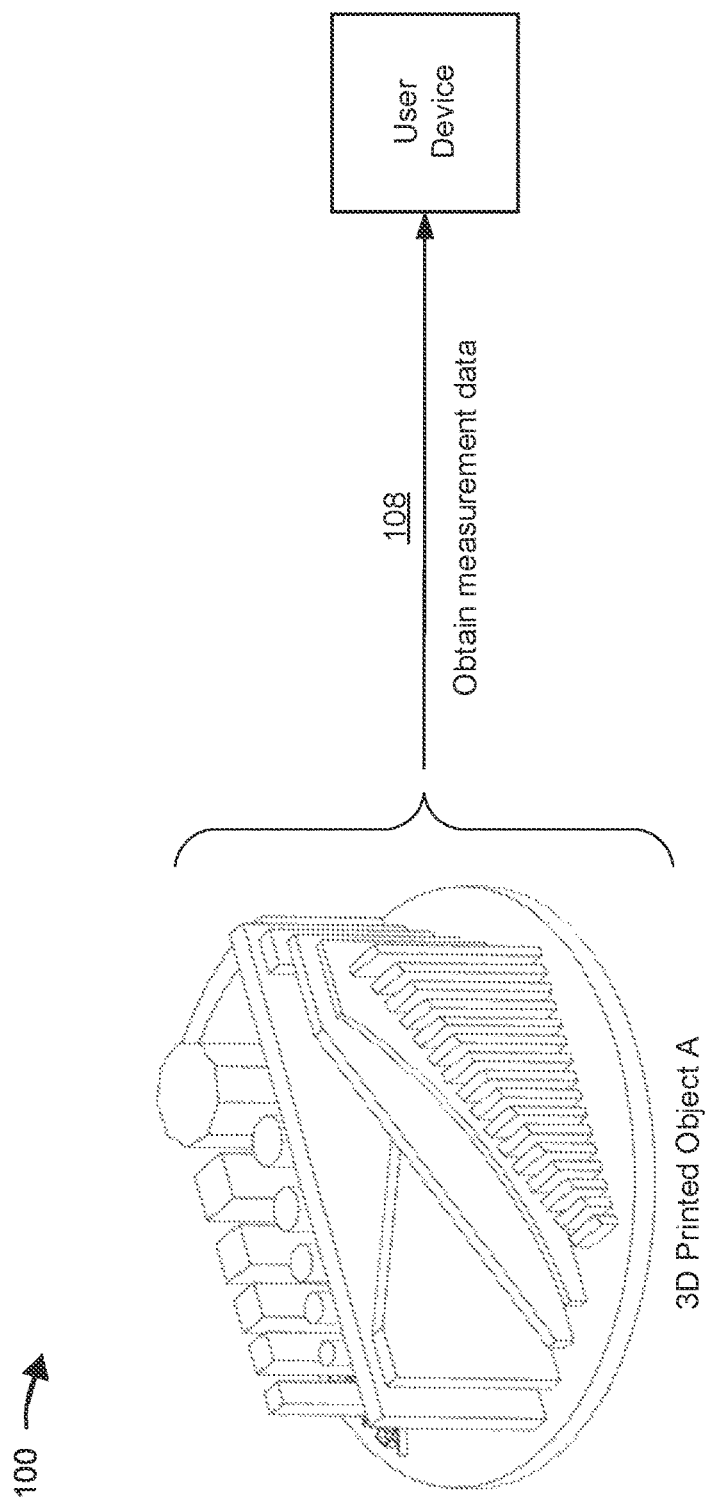

As shown in FIG. 1D and by reference number 108, the user device may obtain measurement data concerning the 3D printed object. In some implementations, the measurement data may include one or more measurements concerning the plurality of physical elements and/or the plurality of different physical attributes. In some implementations, the measurement data may include one or more measurements concerning one or more profiles, one or more dimensions, one or more geometries, one or more coordinates, and/or the like of the plurality of physical elements and/or the plurality of different physical attributes.

In some implementations, the user device may obtain the measurement data from a laser scanner. For example, the laser scanner may measure the 3D printed object using a laser to collect the measurement data and send the measurement data to the user device (e.g., transmit the measurement data to the user device via the network). In some implementations, the user device may obtain the measurement data from a camera device. For example, the camera device may measure the 3D printed object using an optical measuring technique, such as a stereoscopic technique, a photometric technique, a silhouette technique, and/or the like and send the measurement data to the user device (e.g., transmit the measurement data to the user device via the network).

In some implementations, the user device may obtain the measurement data from a user interface of the user device. In some implementations, the user interface may receive the measurement data based on a user of the user device entering the measurement data into the user device via the user interface. For example, the user may determine the measurement data (e.g., by using a caliper, a micrometer, a ruler, a meter stick, a tape measure, an inclinometer, a clinometer, and/or the like) and enter the measurement data into the user device via the user interface (e.g., a physical keyboard, a physical number pad, a digital keyboard, a digital number pad, and/or the like of the user device).

In some implementations, the user device may obtain the measurement data on a schedule. For example, the user device may obtain the measurement data on a scheduled basis (e.g., every hour, every day, every week, every month, and/or the like). In some implementations, the user device may determine the schedule and obtain the measurement data according to the schedule. In some implementations, the user device may obtain the measurement data based on a trigger event. For example, the 3D printer may send a signal to the user device indicating that the 3D printer is to conduct a large print job (e.g., create a large 3D printed object, use a threshold amount of filament for the print job, take a threshold amount of time to print the print job, and/or the like), multiple print jobs (e.g., more than a threshold amount of print jobs), a print job after a threshold amount of time (e.g., 10 hours, a day, a week, a month, and/or the like) since a previous print job was conducted, a print job after a threshold amount of print jobs (e.g., five, ten, one hundred, and/or the like print jobs) have been conducted, and/or the like. The user device may obtain the measurement data bases on receiving the signal. In some implementations, the user device may obtain the measurement data on demand (e.g., based on a user request).

Figure 1E:
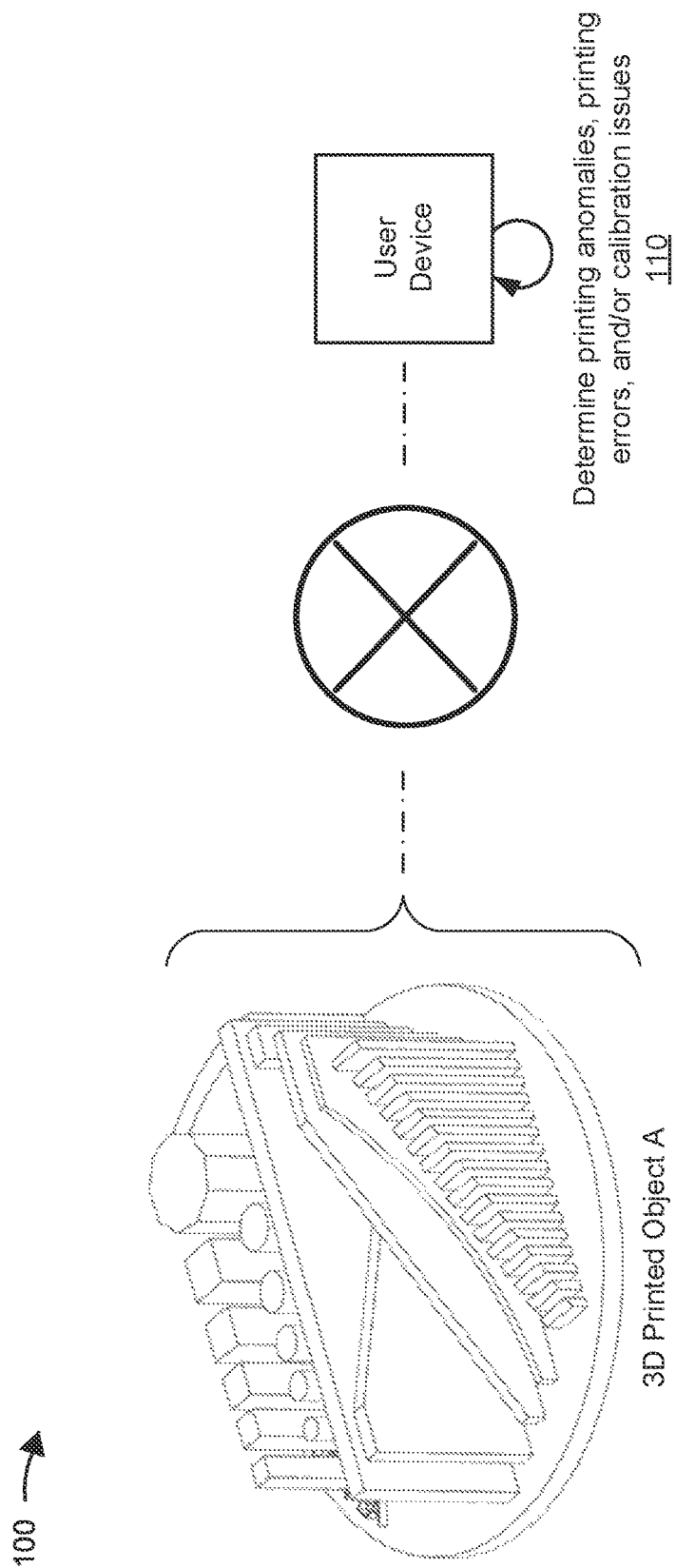

As shown in FIG. 1E and by reference number 110, the user device may determine one or more printing anomalies, one or more printing errors, and/or one or more calibration issues. In some implementations, the user device may process the measurement data to determine one or more printing anomalies, one or more printing errors, one or more calibration issues, and/or the like relating to one or more physical elements, of the plurality of physical elements, and/or one or more physical attributes of the plurality of different physical attributes. For example, the user device may process the measurement data to determine one or more printing anomalies in the x-axis, the y-axis, and/or the z-axis direction of the 3D printed object. As another example, the user device may process the measurement data to determine one or more accumulative printing errors (e.g., printing errors that accumulate due to prior printing errors) in the x-axis, the y-axis, and/or the z-axis direction of the 3D printed object. In some implementations, the user device may process the measurement data to determine one or more calibration issues relating to the one or more physical elements of the plurality of physical elements and/or to the one or more digital processing components.

In some implementations, the user device may process the measurement data by comparing the measurement data and data from a model file (e.g., a Standard for the Exchange of Product model data (STEP) file, an initial graphics exchange specification (IGES) file, and/or the like), a surface representation file (e.g., a standard triangle language (STL) file), a machine readable file (e.g., a geometric code (G-code) file), and/or the like concerning one or more dimensions of the 3D printed object. For example, the user device may process the measurement data by comparing the measurement data and STL file data concerning one or more dimensions of the 3D printed object. The user device may determine a printed length of a physical element, of the plurality of physical elements, of the 3D printed object based on the measurement data and compare the printed length to a model length of the physical element represented by the STL file data. As another example, the user device may process the measurement data by comparing the measurement data and the G-code file data concerning one or more dimensions of the 3D printed object. The user device may determine a printed angle of a physical attribute, of the plurality of different physical attributes, of the 3D printed object based on the measurement data and compare the printed angle to a model angle of the physical attribute represented by the G-code file data.

Figure 1F:
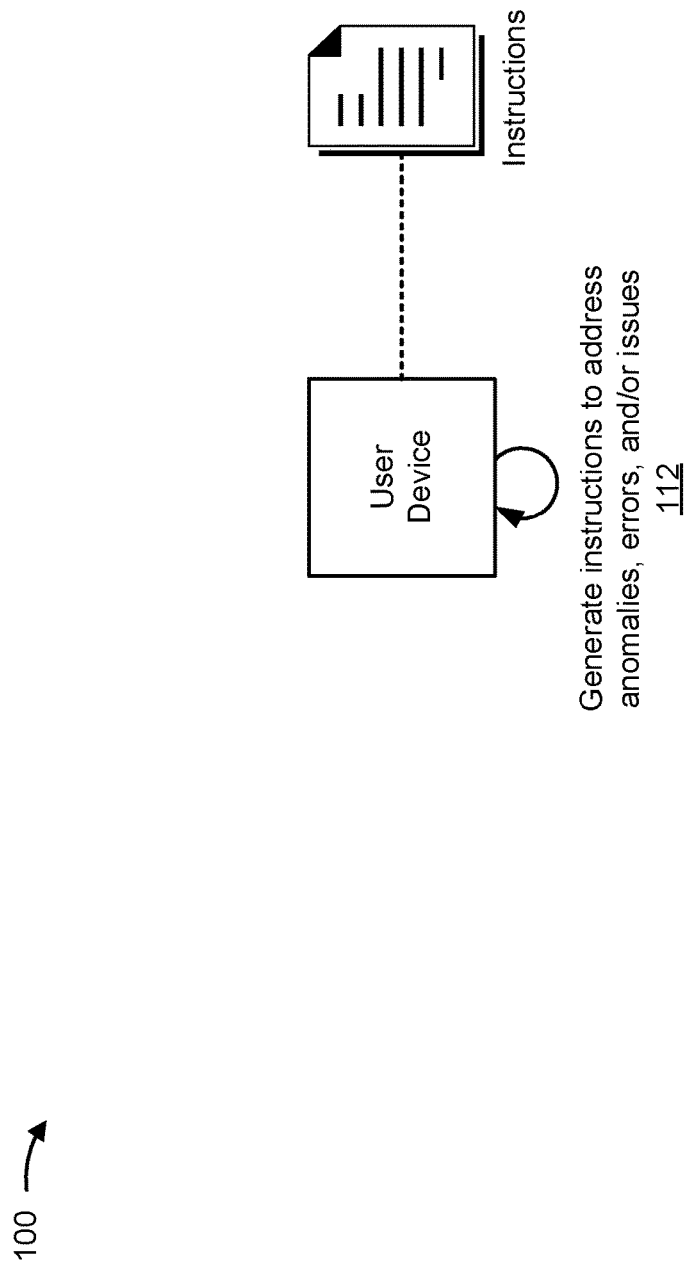

As shown in FIG. 1F and by reference number 112, the user device may generate a set of instructions to address the one or more printing anomalies, the one or more printing errors, and/or the one or more calibration issues. In some implementations, the user device may generate the set of instructions to permit the 3D printer to be adjusted to address the one or more printing anomalies. In some implementations, the user device may generate a set of instructions to permit the 3D printer to be adjusted to prevent future printing errors. In some implementations, the user device may generate a set of instructions to permit the 3D printer to be adjusted to address the one or more calibration issues.

In some implementations, the set of instructions may include a first instruction to check a standard triangle language (STL) file concerning the 3D printed object. In some implementations, the set of instructions may include a second instruction to check a geometric code (G-code) file concerning the 3D printed object. In some implementations, the user device may include a third instruction to check a motor, a gear, a filament, a spool, a band, a print head, an extruder, a fan, a heating element, a nozzle, and/or the like of the 3D printer.

In some implementations, the set of instructions may include executable computer code that can be read and executed by the digital processing components of the 3D printer. In some implementations, the set of instructions can include rules for the 3D printer to perform diagnostic tests on the one or more physical components and/or the one or more digital processing components. In some implementations, the set of instructions may include parameters to be used by an artificial intelligence algorithm of the 3D printer to diagnose the cause of the one or more printing anomalies, the one or more printing errors, and/or the one or more calibration issues.

Figure 1G:
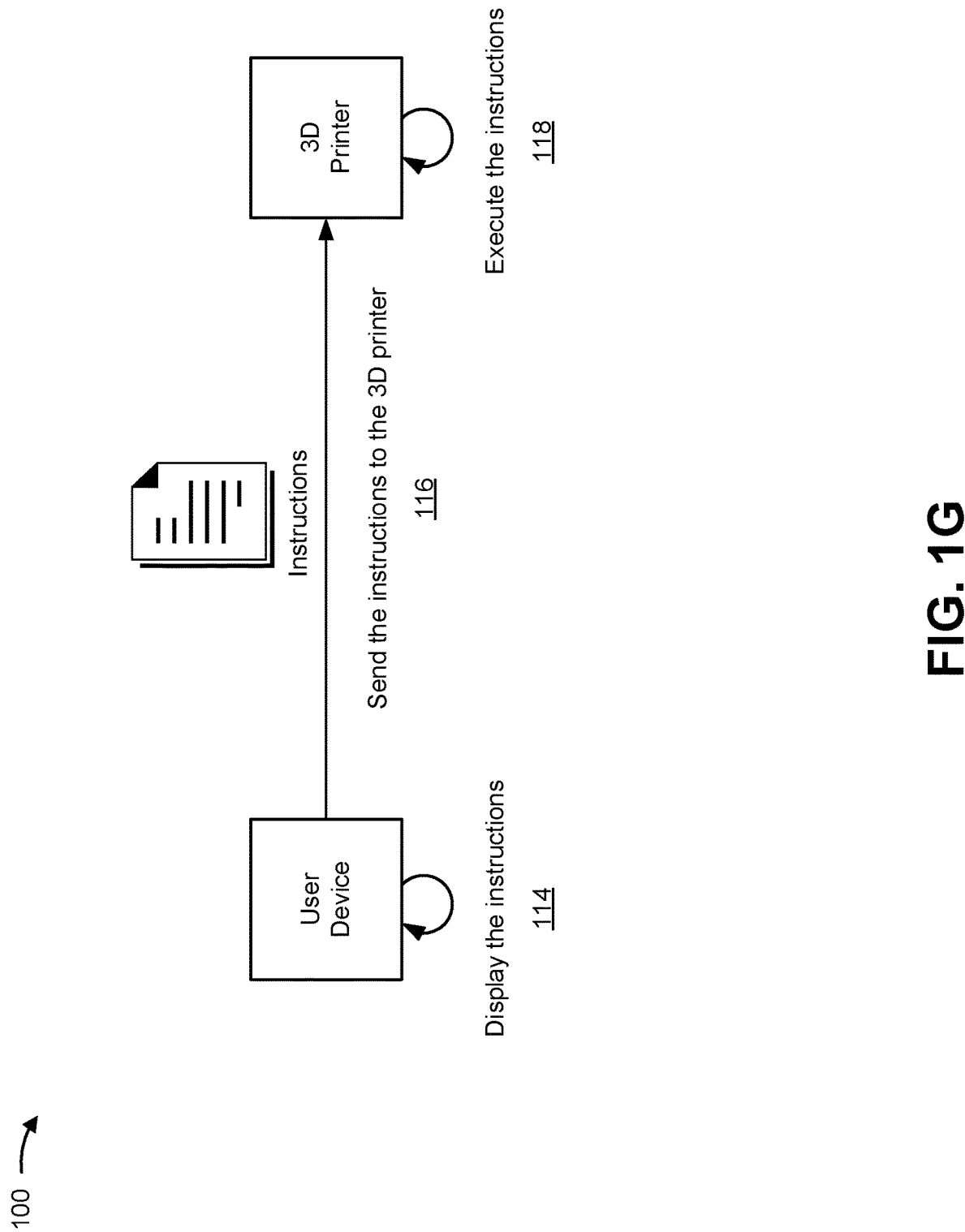

As shown in FIG. 1G, the user device may cause an action to be performed based on generating the set of instructions. As shown by reference number 114, the user device may cause display of the set of instructions by the user device. For example, the user device may cause a user interface of the user device, such as a screen, display, and/or the like, to display the set of instructions.

As shown by reference number 116, the user device may send the set of instruction to the 3D printer. In some implementations, the user device may send the set of instructions to the 3D printer to cause the 3D printer to display the set of instructions. For example, the user device may cause a user interface of the 3D printer, such as a screen, display, and/or the like, to display the set of instructions. In this way, a technician may be able to read the set of instructions while performing maintenance work on the 3D printer.

As shown by reference number 118, the user device may send the set of instructions to the 3D printer to cause the 3D printer to execute the set of instructions. For example, the one or more digital processing components of the 3D printer may receive the set of instructions and execute the set of instruction to update the one or more digital processing components (e.g., perform a software upgrade of the one or more digital processing components), to perform a calibration action concerning the one or more physical components, to perform a correction action concerning the one or more physical components, to perform a reset action concerning the one or more physical components, and/or the like. In this way, the 3D printer may be automatically (e.g., without user intervention) updated, reconfigured, and/or the like to remove or mitigate the one or more printing anomalies, the one or more printing errors, and/or the one or more calibration issues.

As indicated above, FIGS. 1A-1G are provided merely as examples. Other examples are possible and may differ from what was described with regard to FIGS. 1A-1G.

Figure 2:
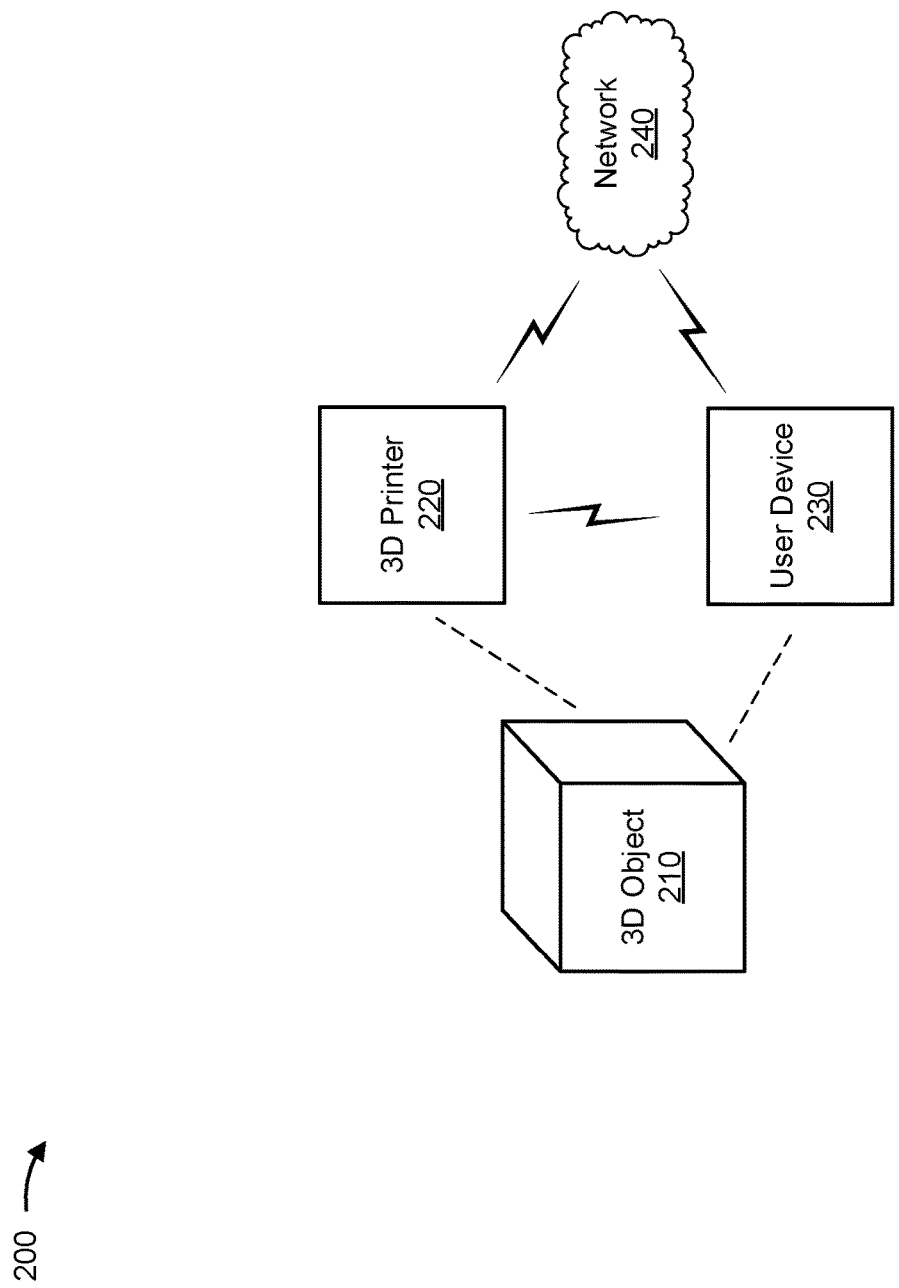
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a three-dimensional (3D) object 210, a 3D printer 220, a user device 230, and a network 240. Devices of environment 200 may interconnect via wired connections, wireless connections, or a combination of wired and wireless connections.

3D object 210 may include one or more objects capable of being created by a 3D printer. For example, 3D object 210 may be a three-dimensional physical structure that is created, printed, generated, and/or the like by 3D printer 220, as described herein. In some implementations, 3D object 210 may include a plurality of physical elements (e.g., cylinders, pyramids, spheres, frustums, cubes, cuboids, prisms, cones, columns, and/or the like). In some implementations, 3D object 210 may include a plurality of physical elements that comprise a plurality of different physical attributes (e.g., curved features, concave features, convex features, plane features, elliptical features, hyperbolic features, step features, gradient features, and/or the like).

3D printer 220 may include one or more components capable of receiving data, processing the data, and/or generating a 3D physical structure based on the data. For example, 3D printer 220 may create, print, and/or generate 3D object 210 using a 3D printing technique, such as an additive manufacturing technique, a subtractive manufacturing technique, and/or the like. In some implementations, the 3D printer may include one or more physical components, such as a motor, a gear, a filament, a spool, a band, a print head, an extruder, a fan, a heating element, a nozzle, and/or the like. In some implementations, 3D printer 220 may include one or more digital processing components to receive information and may, based on the information, operate and/or control the one or more physical components to generate a three dimensional physical structure based on a base material, such as plastic (e.g., thermoplastic, photopolymer, plastic film, etc.), metal (e.g., titanium alloys, metal powder, eutectic metal, etc.), ceramic (e.g., ceramic powder, etc.), plaster, etc. In one example, 3D printer 220 may use one or more known three-dimensional printing techniques and/or technologies, such as stereolithography technology (e.g., photopolymerization); additive process technology (e.g., selective laser sintering, molten polymer deposition, granular materials binding, etc.); and/or other three-dimensional printing techniques and/or technologies. In some implementations, 3D printer 220 may receive instructions from user device 230, and may execute the instructions.

User device 230 may include one or more devices capable of receiving, generating, storing, processing, and/or providing information associated with determining a printing anomaly related to a 3D printed object. For example, user device 230 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. User device 230 may obtain measurement data concerning 3D object 210 (e.g., from a laser scanner, a user interface, a camera device, and/or the like), may determine printing anomalies, printing errors, and/or calibration issues (e.g., based on processing the measurement data), and may generate instructions to address the printing anomalies, printing errors, and/or calibration issues. In some implementations, user device 230 may display the instructions, may send the instructions to 3D printer 220, and/or the like.

Network 240 may include one or more wired and/or wireless networks. For example, network 240 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
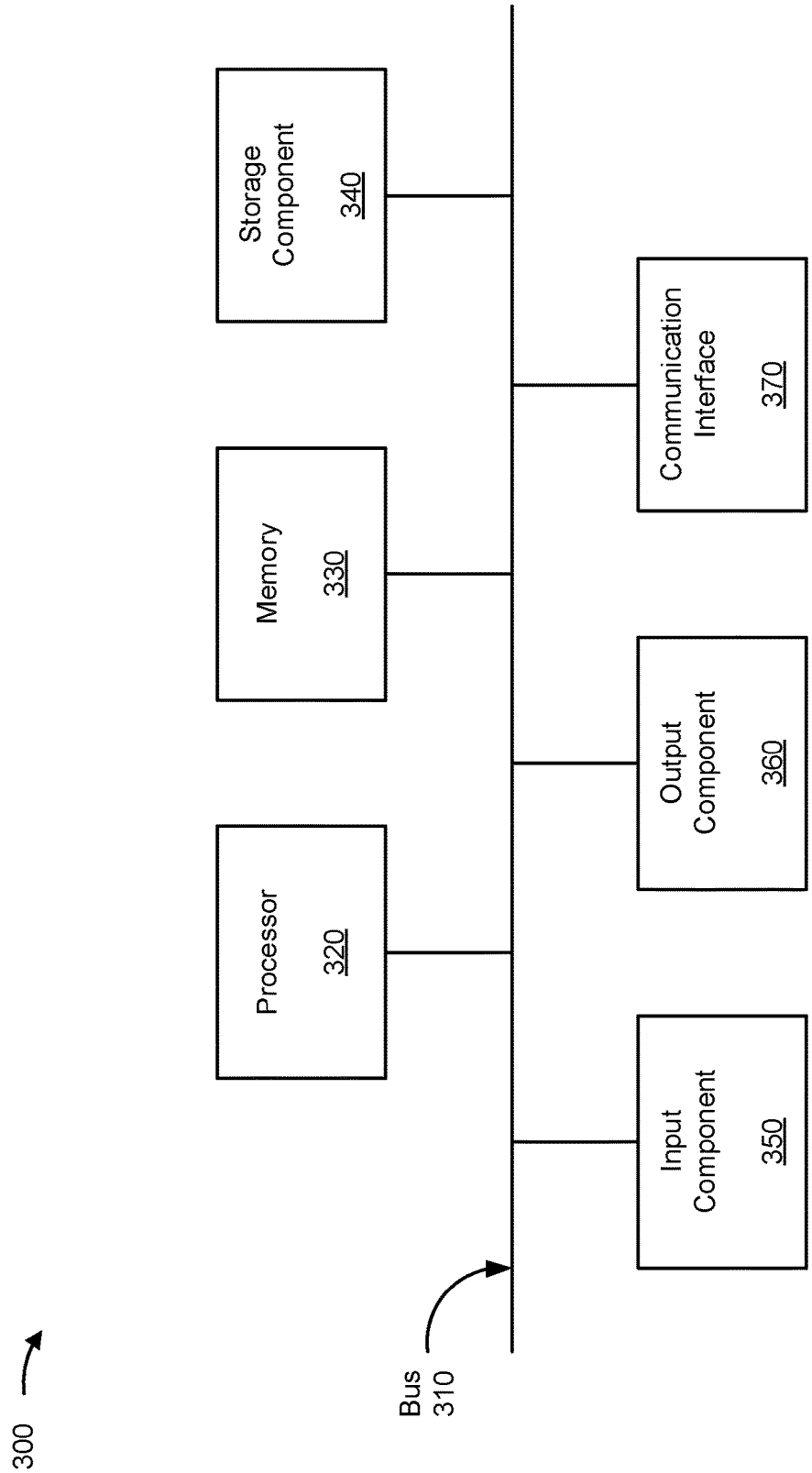
FIG. 3 is a diagram of example components of one or more devices of FIG. 2.

FIG. 3 is a diagram of example components of a device 300. Device 300 may correspond to 3D printer 220, user device 230, and/or the like. In some implementations, 3D printer 220, user device 230, and/or the like may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
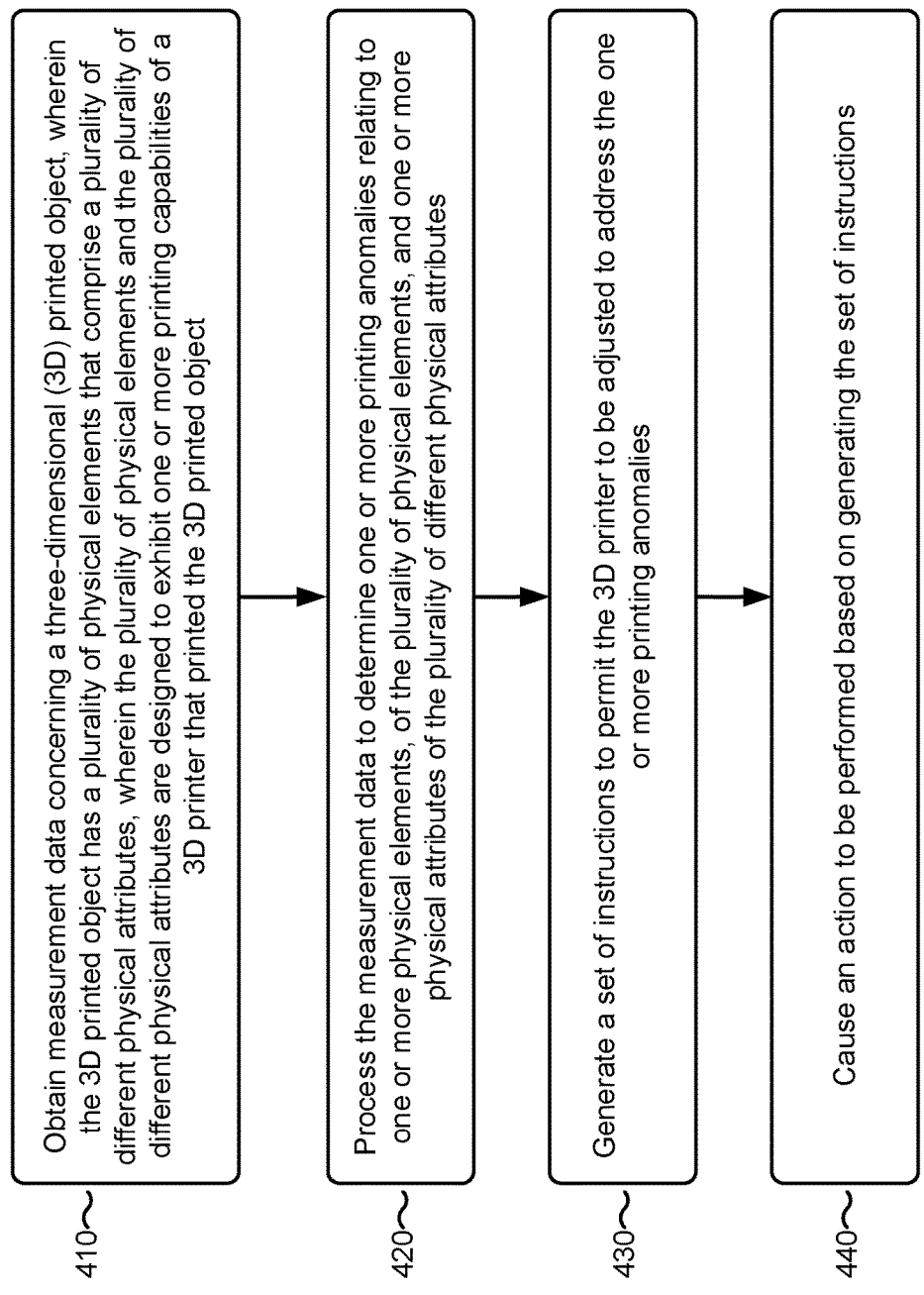
FIG. 4 is a flow chart of an example process for determining a printing anomaly related to a 3D printed object.

FIG. 4 is a flow chart of an example process 400 for determining a printing anomaly related to a 3D printed object. In some implementations, one or more process blocks of FIG. 4 may be performed by a user device (e.g., user device 230). In some implementations, one or more process blocks of FIG. 4 may be performed by another device or a group of devices separate from or including the user device, such as a 3D printer (e.g., 3D printer 220) and/or the like.

As shown in FIG. 4, process 400 may include obtaining measurement data concerning a three-dimensional (3D) printed object, wherein the 3D printed object has a plurality of physical elements that comprise a plurality of different physical attributes, wherein the plurality of physical elements and the plurality of different physical attributes are designed to exhibit one or more printing capabilities of a 3D printer that printed the 3D printed object (block 410). For example, the user device (e.g., using processor 320, memory 330, storage component 340, input component 350, communication interface 370, and/or the like) may obtain measurement data concerning a 3D printed object, as described above in connection with FIGS. 1A-1G. In some implementations, the 3D printed object may have a plurality of physical elements that comprise a plurality of different physical attributes, and the plurality of physical elements and the plurality of different physical attributes may be designed to exhibit one or more printing capabilities of a 3D printer that printed the 3D printed object.

As further shown in FIG. 4, process 400 may include processing the measurement data to determine one or more printing anomalies relating to one or more physical elements, of the plurality of physical elements, and one or more physical attributes of the plurality of different physical attributes (block 420). For example, the user device (e.g., using processor 320, memory 330, storage component 340, and/or the like) may process the measurement data to determine one or more printing anomalies relating to one or more physical elements, of the plurality of physical elements, and one or more physical attributes of the plurality of different physical attributes, as described above in connection with FIGS. 1A-1G.

As further shown in FIG. 4, process 400 may include generating a set of instructions to permit the 3D printer to be adjusted to address the one or more printing anomalies (block 430). For example, the user device (e.g., using processor 320, memory 330, storage component 340, and/or the like) may generate a set of instructions to permit the 3D printer to be adjusted to address the one or more printing anomalies, as described above in connection with FIGS. 1A-1G.

As further shown in FIG. 4, process 400 may include causing an action to be performed based on generating the set of instructions (block 440). For example, the user device (e.g., using processor 320, memory 330, storage component 340, input component 350, output component 360, communication interface 370, and/or the like) may cause an action to be performed based on generating the set of instructions, as described above in connection with FIGS. 1A-1G.

Process 400 may include additional implementations, such as any single implementation or any combination of implementations described below and/or in connection with one or more other processes described elsewhere herein.

In some implementations, the plurality of physical elements may include one or more cylinders, one or more pyramids, one or more spheres, one or more frustums, one or more cubes, one or more prisms, or one or more cones. In some implementations, the plurality of different physical attributes may include one or more curved features, one or more concave features, one or more convex features, one or more plane features, one or more elliptical features, one or more hyperbolic features, one or more step features, or one or more gradient features.

In some implementations, the plurality of different physical attributes may include one or more positive attributes and one or more negative attributes. In some implementations, the plurality of physical elements may include one or more additive elements or one or more subtractive elements.

In some implementations, when processing the measurement data to determine the one or more printing anomalies relating to the one or more physical elements or one or more physical attributes, the user device may determine the one or more printing anomalies in an x-axis, a y-axis, and/or a z-axis direction of the 3D printed object. In some implementations, when processing the measurement data to determine the one or more printing anomalies relating to the one or more physical elements or the one or more physical attributes, the user device may determine one or more accumulative printing errors in an x-axis, a y-axis, and/or a z-axis direction of the 3D printed object.

In some implementations, the set of instructions may include a first instruction to check a standard triangle language (STL) file concerning the 3D printed object, a second instruction to check a geometric code (G-code) file concerning the 3D printed object, or a third instruction to check a motor, a gear, a filament, a spool, a band, a print head, an extruder, a fan, a heating element, or a nozzle of the 3D printer.

In some implementations, when obtaining the measurement data concerning the 3D printed object, the user device may receive the measurement data from a laser scanner, where the laser scanner measures the 3D printed object using a laser. In some implementations, when obtaining the measurement data concerning the 3D printed object, the user device may receive the measurement data from a user interface of the device, where the user interface is to receive the measurement data based on a user of the device entering the measurement data into the device via the user interface.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
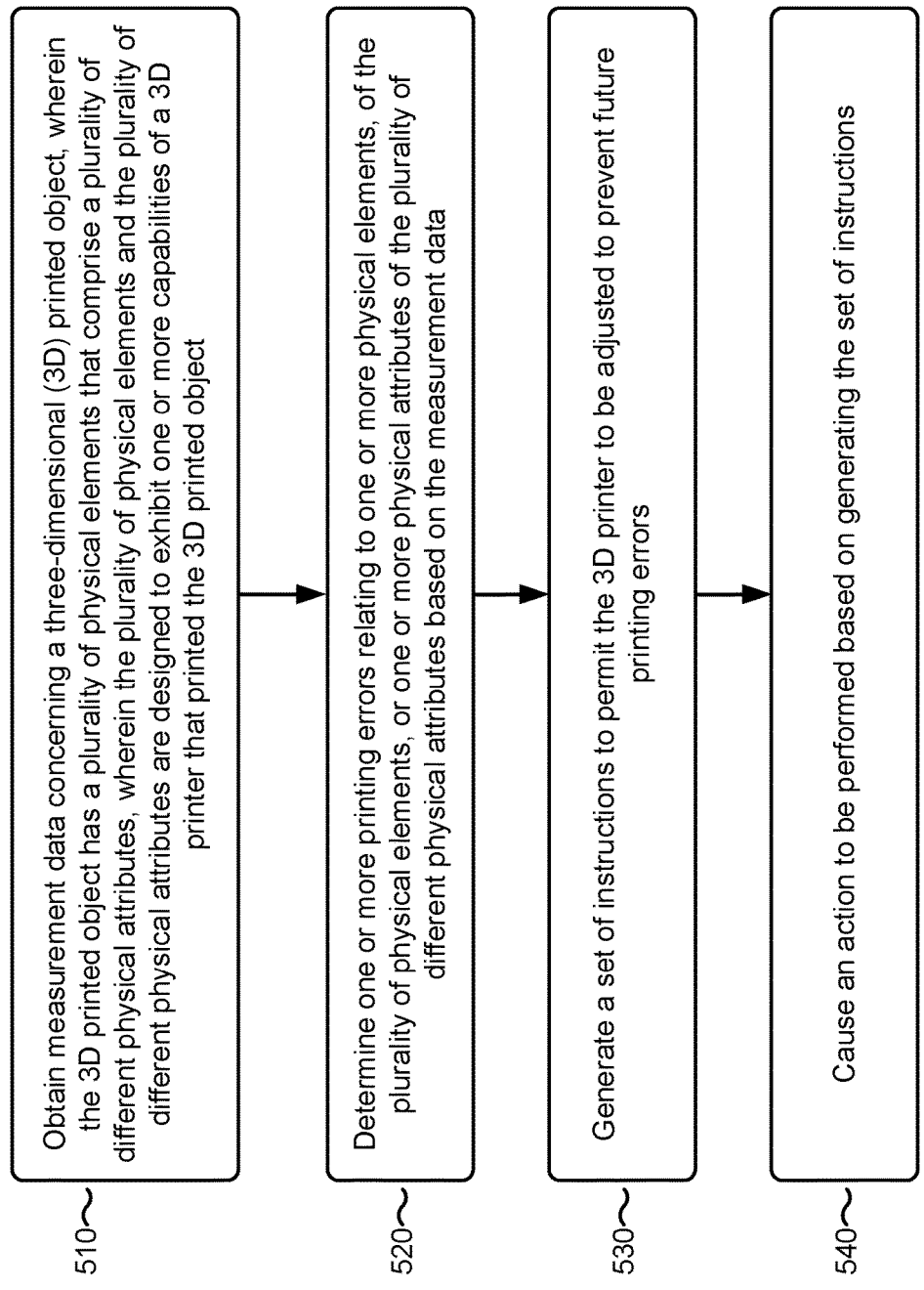
FIG. 5 is a flow chart of an example process for determining a printing anomaly related to a 3D printed object.

FIG. 5 is a flow chart of an example process 500 for determining a printing anomaly related to a 3D printed object. In some implementations, one or more process blocks of FIG. 5 may be performed by a user device (e.g., user device 230). In some implementations, one or more process blocks of FIG. 5 may be performed by another device or a group of devices separate from or including the user device, such as a 3D printer (e.g., 3D printer 220) and/or the like.

As shown in FIG. 5, process 500 may include obtaining measurement data concerning a three-dimensional (3D) printed object, wherein the 3D printed object has a plurality of physical elements that comprise a plurality of different physical attributes, and wherein the plurality of physical elements and the plurality of different physical attributes are designed to exhibit one or more capabilities of a 3D printer that printed the 3D printed object (block 510). For example, the user device (e.g., using processor 320, memory 330, storage component 340, input component 350, communication interface 370, and/or the like) may obtain measurement data concerning a 3D printed object, as described above in connection with FIGS. 1A-1G. In some implementations, the 3D printed object may have a plurality of physical elements that comprise a plurality of different physical attributes, and the plurality of physical elements and the plurality of different physical attributes may be designed to exhibit one or more capabilities of a 3D printer that printed the 3D printed object.

As further shown in FIG. 5, process 500 may include determining one or more printing errors relating to one or more physical elements, of the plurality of physical elements, or one or more physical attributes of the plurality of different physical attributes based on the measurement data (block 520). For example, the user device (e.g., using processor 320, memory 330, storage component 340, and/or the like) may determine one or more printing errors relating to one or more physical elements, of the plurality of physical elements, or one or more physical attributes of the plurality of different physical attributes based on the measurement data, as described above in connection with FIGS. 1A-1G.

As further shown in FIG. 5, process 500 may include generating a set of instructions to permit the 3D printer to be adjusted to prevent future printing errors (block 530). For example, the user device (e.g., using processor 320, memory 330, storage component 340, and/or the like) may generate a set of instructions to permit the 3D printer to be adjusted to prevent future printing errors, as described above in connection with FIGS. 1A-1G.

As further shown in FIG. 5, process 500 may include causing an action to be performed based on generating the set of instructions (block 540). For example, the user device (e.g., using processor 320, memory 330, storage component 340, input component 350, output component 360, communication interface 370, and/or the like) may cause an action to be performed based on generating the set of instructions, as described above in connection with FIGS. 1A-1G.

Process 500 may include additional implementations, such as any single implementation or any combination of implementations described below and/or in connection with one or more other processes described elsewhere herein.

In some implementations, when obtaining the measurement data concerning the 3D printed object, the user device may obtain the measurement data from a camera device, where the camera device measures the 3D printed object using an optical measuring technique. In some implementations, the plurality of physical elements and the plurality of different physical attributes may be designed to exhibit one or more capabilities of one or more physical components of the 3D printer.

In some implementations, the plurality of physical elements and the plurality of different physical attributes may be designed to exhibit one or more capabilities of one or more digital processing components of the 3D printer. In some implementations, the plurality of physical elements and the plurality of different physical attributes may be designed to exhibit an x-axis, a y-axis, and a z-axis printing capability of the 3D printer.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
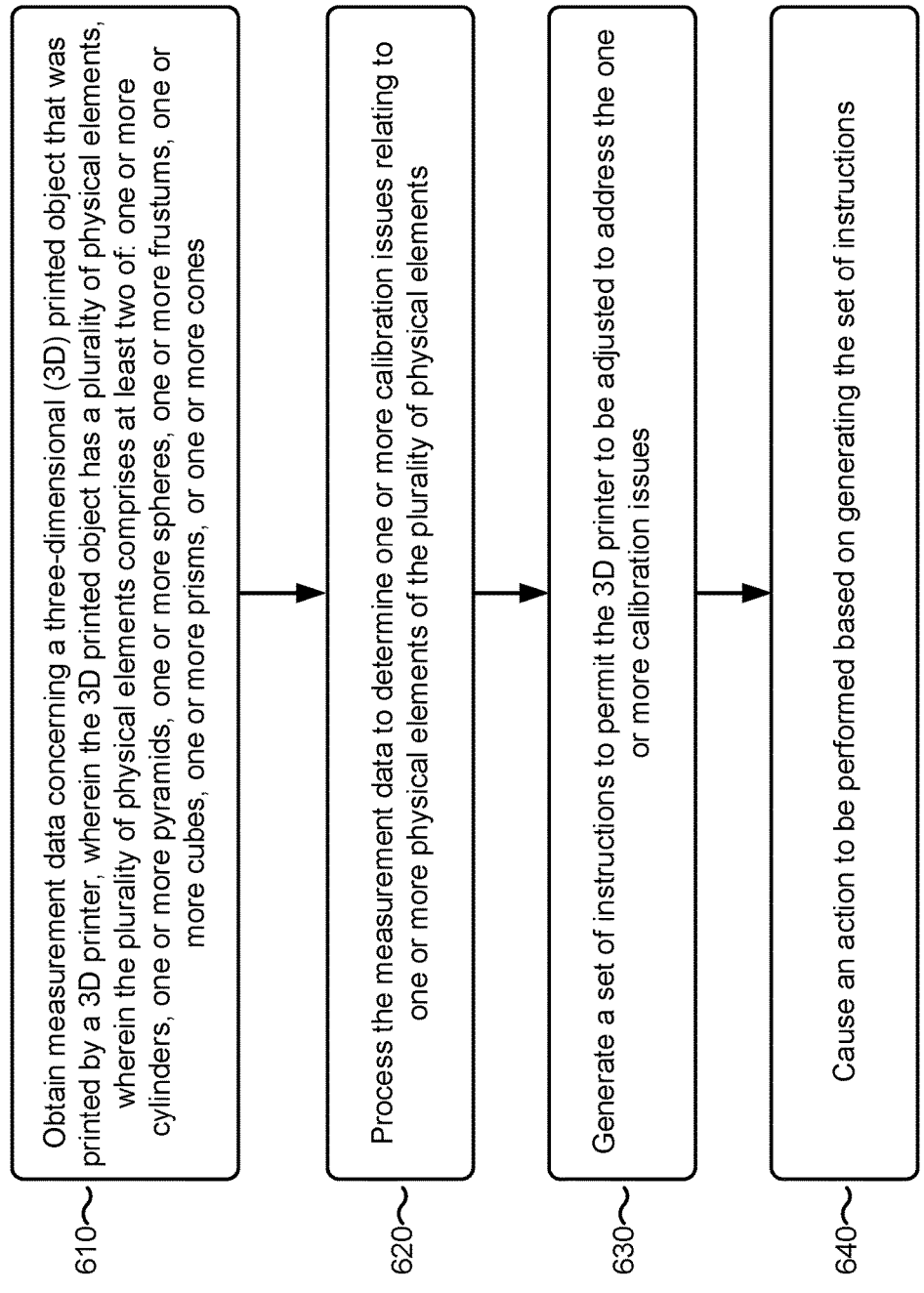
FIG. 6 is a flow chart of an example process for determining a printing anomaly related to a 3D printed object.

FIG. 6 is a flow chart of an example process 600 for determining a printing anomaly related to a 3D printed object. In some implementations, one or more process blocks of FIG. 6 may be performed by a user device (e.g., user device 230). In some implementations, one or more process blocks of FIG. 6 may be performed by another device or a group of devices separate from or including the user device, such as a 3D printer (e.g., 3D printer 220) and/or the like.

As shown in FIG. 6, process 600 may include obtaining measurement data concerning a three-dimensional (3D) printed object that was printed by a 3D printer, wherein the 3D printed object has a plurality of physical elements, and wherein the plurality of physical elements comprises at least two of one or more cylinders, one or more pyramids, one or more spheres, one or more frustums, one or more cubes, one or more prisms, or one or more cones (block 610). For example, the user device (e.g., using processor 320, memory 330, storage component 340, input component 350, communication interface 370, and/or the like) may obtain measurement data concerning a 3D printed object that was printed by a 3D printer, as described above in connection with FIGS. 1A-1G. In some implementations, the plurality of physical elements may include at least two of one or more cylinders, one or more pyramids, one or more spheres, one or more frustums, one or more cubes, one or more prisms, or one or more cones.

As further shown in FIG. 6, process 600 may include processing the measurement data to determine one or more calibration issues relating to one or more physical elements of the plurality of physical elements (block 620). For example, the user device (e.g., using processor 320, memory 330, storage component 340, and/or the like) may process the measurement data to determine one or more calibration issues relating to one or more physical elements of the plurality of physical elements, as described above in connection with FIGS. 1A-1G.

As further shown in FIG. 6, process 600 may include generating a set of instructions to permit the 3D printer to be adjusted to address the one or more calibration issues (block 630). For example, the user device (e.g., using processor 320, memory 330, storage component 340, and/or the like) may generate a set of instructions to permit the 3D printer to be adjusted to address the one or more calibration issues, as described above in connection with FIGS. 1A-1G.

As further shown in FIG. 6, process 600 may include causing an action to be performed based on generating the set of instructions (block 640). For example, the user device (e.g., using processor 320, memory 330, storage component 340, input component 350, output component 360, communication interface 370, and/or the like) may cause an action to be performed based on generating the set of instructions, as described above in connection with FIGS. 1A-1G.

Process 600 may include additional implementations, such as any single implementation or any combination of implementations described below and/or in connection with one or more other processes described elsewhere herein.

In some implementations, when processing the measurement data to determine the one or more calibration issues relating to the one or more physical elements, the user device may process the measurement data by comparing the measurement data and standard triangle language (STL) file data concerning one or more dimensions of the 3D printed object.

In some implementations, when processing the measurement data to determine the one or more calibration issues relating to the one or more physical elements, the user device may process the measurement data by comparing the measurement data and geometric code (G-code) file data concerning one or more dimensions of the 3D printed object.

In some implementations, when causing the action to be performed based on generating the set of instructions, the user device may cause display of the set of instructions by the device. In some implementations, when causing the action to be performed based on generating the set of instructions, the user device may send the set of instructions to the 3D printer to cause the 3D printer to execute the set of instructions.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
    obtaining, by a device, measurement data concerning a plurality of different physical attributes of a plurality of physical elements of a three-dimensional (3D) printed object,
        wherein the plurality of physical elements comprise:
            a first plurality of physical elements with concave features of the plurality of different physical attributes, and
            a second plurality of physical elements with convex features of the plurality of different physical attributes, and
        wherein the plurality of different physical attributes exhibit one or more capabilities of a 3D printer that printed the 3D printed object;
    determining, by the device and based on the measurement data, one or more printing errors relating to at least one of one or more physical elements, of the plurality of physical elements, or one or more physical attributes of the plurality of different physical attributes;
    generating, by the device and based on the one or more printing errors, a set of instructions for adjusting the 3D printer to prevent an additional printing error; and
    causing, by the device and based on the set of instructions, an action to be performed.

2. The method of claim 1, wherein the set of instructions include an instruction to check one or more physical components of the 3D printer, and wherein the action includes at least one of:
    performing a calibration action concerning the one or more physical components,
    performing a correction action concerning the one or more physical components, or
    performing a reset action concerning the one or more physical components.

3. The method of claim 1, wherein the plurality of physical elements and the plurality of different physical attributes are designed to exhibit an x-axis, a y-axis, and a z-axis printing capability of the 3D printer.

4. The method of claim 1, wherein the plurality of physical elements and the plurality of different physical attributes are designed to exhibit one or more capabilities of one or more digital processing components of the 3D printer.

5. The method of claim 1, wherein obtaining the measurement data concerning the 3D printed object comprises:
    obtaining the measurement data from a camera device,
        wherein the camera device measures the 3D printed object using an optical measuring technique.

6. The method of claim 1, wherein the set of instructions includes one or more of:
    a first instruction to check a standard triangle language (STL) file concerning the 3D printed object,
    a second instruction to check a geometric code (G-code) file concerning the 3D printed object, or
    a third instruction to check at least one of a motor, a gear, a filament, a spool, a band, a print head, an extruder, a fan, a heating element, or a nozzle of the 3D printer.

7. The method of claim 1, further comprising:
    utilizing artificial intelligence to diagnose the one or more printing errors.

8. A device, comprising:
    one or more memories; and
    one or more processors communicatively coupled to the one or more memories, configured to:
        obtain measurement data concerning a plurality of different physical attributes of a plurality of physical elements of a three-dimensional (3D) printed object,
            wherein the plurality of physical elements comprise:
                a first plurality of physical elements with concave features of the plurality of different physical attributes, and
                a second plurality of physical elements with convex features of the plurality of different physical attributes, and
            wherein the plurality of different physical attributes exhibit one or more capabilities of a 3D printer that printed the 3D printed object;
        determine, based on the measurement data, one or more printing errors relating to at least one of one or more physical elements, of the plurality of physical elements, or one or more physical attributes of the plurality of different physical attributes; and
        cause an action to be performed based on determining the one or more printing errors.

9. The device of claim 8, further comprising:
    generate a set of instructions to permit the 3D printer to be adjusted to prevent an additional printing error; and
    wherein the set of instructions include an instruction to check one or more physical components of the 3D printer, and wherein the action includes at least one of:
        perform a calibration action concerning the one or more physical components,
        perform a correction action concerning the one or more physical components, or
        perform a reset action concerning the one or more physical components.

10. The device of claim 9, wherein the one or more physical components of the 3D printer include at least one of:
    a motor,
    a gear,
    a filament,
    a spool,
    a band, a print head,
an extruder,
a fan,
a heating element, or
a nozzle.

11. The device of claim 8, wherein the plurality of physical elements and the plurality of different physical attributes are designed to exhibit an x-axis, a y-axis, and a z-axis printing capability of the 3D printer.

12. The device of claim 8, wherein the plurality of physical elements and the plurality of different physical attributes are designed to exhibit one or more capabilities of one or more digital processing components of the 3D printer.

13. The device of claim 8, wherein the plurality of physical elements comprises:
one or more cylinders;
one or more pyramids;
one or more spheres;
one or more frustums;
one or more cubes;
one or more prisms; or
one or more cones.

14. The device of claim 8, wherein the plurality of different physical attributes further comprises:
one or more curved features;
one or more plane features;
one or more elliptical features;
one or more hyperbolic features;
one or more step features; or
one or more gradient features.

15. A non-transitory computer-readable medium storing instructions, the instructions comprising:
one or more instructions that, when executed by one or more processors, cause the one or more processors to:
obtain measurement data a plurality of different physical attributes of a plurality of physical elements of concerning a three-dimensional (3D) printed object, wherein the plurality of physical elements comprise:
a first plurality of physical elements with concave features of the plurality of different physical attributes, and
a second plurality of physical elements with convex features of the plurality of different physical attributes;
process the measurement data to determine one or more printing errors relating to at least one or more physical elements, of the plurality of physical elements, or one or more physical attributes of the plurality of different physical attributes;
generate, based on the one or more printing errors, a set of instructions for adjusting a 3D printer to prevent an additional printing error; and
cause, based on the set of instructions, an action to be performed.

16. The non-transitory computer-readable medium of claim 15, wherein the set of instructions include an instruction to check one or more physical components of the 3D printer, and wherein the action includes at least one of:
perform a calibration action concerning the one or more physical components,
perform a correction action concerning the one or more physical components, or
perform a reset action concerning the one or more physical components.

17. The non-transitory computer-readable medium of claim 15, wherein the plurality of physical elements comprises one or more additive elements or one or more subtractive elements.

18. The non-transitory computer-readable medium of claim 15, wherein the plurality of physical elements and the plurality of different physical attributes are designed to exhibit one or more capabilities of one or more digital processing components of the 3D printer.

19. The non-transitory computer-readable medium of claim 15, wherein the one or more instructions, that cause the one or more processors to process the measurement data to determine the one or more printing errors relating to the one or more physical elements or the one or more physical attributes, cause the one or more processors to:
determine one or more accumulative printing errors in an x-axis, a y-axis, and/or a z-axis direction of the 3D printed object.

20. The non-transitory computer-readable medium of claim 15, wherein the one or more instructions, that cause the one or more processors to obtain the measurement data concerning the 3D printed object, cause the one or more processors to:
receive the measurement data from a laser scanner.

* * * * *